(12) United States Patent
Khan et al.

(10) Patent No.: US 11,218,421 B1
(45) Date of Patent: Jan. 4, 2022

(54) METHODS AND SYSTEMS FOR MIGRATING VIRTUAL PRIVATE CLOUD (VPC) RESOURCES ACROSS PUBLIC CLOUD ENVIRONMENTS

(71) Applicant: Wanclouds Inc., Santa Clara, CA (US)

(72) Inventors: Faiz M. Khan, Santa Clara, CA (US); Maimoona Iqbal, Santa Clara, CA (US); Danyal Khan, Santa Clara, CA (US)

(73) Assignee: Wanclouds Inc., Santa Clara, CA (US)

( * ) Notice: Subject to any disclaimer, the term of this patent is extended or adjusted under 35 U.S.C. 154(b) by 0 days.

(21) Appl. No.: 17/224,122

(22) Filed: Apr. 7, 2021

(51) Int. Cl.
*H04L 12/923* (2013.01)
*H04L 12/911* (2013.01)
*H04L 29/06* (2006.01)

(52) U.S. Cl.
CPC .......... *H04L 47/762* (2013.01); *H04L 47/781* (2013.01); *H04L 47/821* (2013.01); *H04L 47/826* (2013.01); *H04L 63/0272* (2013.01)

(58) Field of Classification Search
CPC ........ G06N 20/00; G06N 3/08; G06N 3/0454; G06N 3/04; G06N 5/04; G16H 50/20; G16H 10/60; G16H 40/67; G16H 50/30; G16H 50/70; G16H 15/00; H04L 67/1097
See application file for complete search history.

(56) References Cited

U.S. PATENT DOCUMENTS

| | | | |
|---|---|---|---|
| 9,935,845 B2 | 4/2018 | Firment et al. | |
| 10,033,691 B1 | 7/2018 | Mizik et al. | |
| 10,367,655 B2 | 7/2019 | Cheng et al. | |
| 10,516,590 B2 | 12/2019 | Mizik et al. | |
| 10,915,347 B1* | 2/2021 | Per ...................... | G06F 9/45558 |
| 10,938,884 B1 | 3/2021 | Baldwin et al. | |
| 2014/0146055 A1* | 5/2014 | Bala .......................... | G06F 8/63 |
| | | | 345/501 |
| 2015/0096011 A1* | 4/2015 | Watt .................... | H04L 63/0272 |
| | | | 726/15 |
| 2016/0352836 A1 | 12/2016 | Kamalakantha et al. | |
| 2018/0329700 A1* | 11/2018 | Doshi ..................... | H04L 41/12 |

\* cited by examiner

*Primary Examiner* — Michael A Keller
*Assistant Examiner* — Thao D Duong
(74) *Attorney, Agent, or Firm* — Kanika Radhakrishnan; Evergreen Valley Law Group

(57) ABSTRACT

Methods and systems for migrating resources of a virtual private cloud across public cloud environments are described. The method performed by server system includes discovering a plurality of resources associated with a source cloud via an application programming interface (API) of the source cloud and generating resource models associated with the plurality of resources based, at least in part, on the discovered resources of the source cloud. The resource models include information of the plurality of resources and relationships between the plurality of resources. The method includes storing the resource models associated with the source cloud in a database and migrating the plurality of resources of the source cloud to a different region of the source cloud or a target cloud based, at least in part, on the resource models associated with the plurality of resources.

17 Claims, 8 Drawing Sheets

METHODS AND SYSTEMS FOR MIGRATING VIRTUAL PRIVATE CLOUD (VPC) RESOURCES ACROSS PUBLIC CLOUD ENVIRONMENTS

TECHNICAL FIELD

The present invention relates to the field of data management, more particularly to, electronic methods and complex processing systems for discovering, storing and backing up various virtual private cloud (VPC) resources across multiple public cloud environments.

BACKGROUND

Currently, there are various automation tools (such as Terraform, Ansible, cloud formation, etc.) used to create deployment scripts for configuring and maintaining configurations for a cloud infrastructure or resources. Customers typically deploy their cloud infrastructure in a carved-out space in a public cloud called virtual private cloud or VPC.

Hence, there is a need for methods and systems for facilitating automated migration and translation of VPC resources across multiple public cloud environments.

SUMMARY

Various embodiments of the present disclosure provide methods and systems for migrating resources of a virtual private cloud across multiple public cloud environments.

In an embodiment, a computer-implemented method is disclosed. The computer-implemented method performed by a server system includes discovering a plurality of resources associated with a source cloud via an application programming interface (API) of the source cloud and generating resource models associated with the plurality of resources based, at least in part, on the discovered resources of the source cloud. The resource models include information of the plurality of resources and relationships between the plurality of resources. The method includes storing the resource models associated with the source cloud in a database and migrating the plurality of resources of the source cloud to a different region of the source cloud or a target cloud based, at least in part, on the resource models associated with the plurality of resources.

In another embodiment, a server system is disclosed. The server system includes a communication interface, a memory including executable instructions, and a processor communicably coupled to the communication interface. The processor is configured to execute the executable instructions to cause the server system to at least discover a plurality of resources associated with a source cloud via an application programming interface (API) of the source cloud and generate resource models associated with the plurality of resources based, at least in part, on the discovered resources of the source cloud. The server system is further caused to store the resource models associated with the source cloud in a database and migrate the plurality of resources of the source cloud to a different region of the source cloud or a target cloud based, at least in part, on the resource models associated with the plurality of resources.

In yet another embodiment, a computer-implemented method for migrating virtual private cloud (VPC) resources across public cloud environments is disclosed. The computer-implemented method performed by a server system includes discovering a plurality of resources associated with a source cloud via an application programming interface (API) of the source cloud and generating resource models associated with the plurality of resources based, at least in part, on the discovered resources of the source cloud. The resource models include information of the plurality of resources and relationships between the plurality of resources. The method includes storing the resource models associated with the source cloud in a database and migrating the plurality of resources of the source cloud to a different region of the source cloud or a target cloud based, at least in part, on the resource models associated with the plurality of resources.

BRIEF DESCRIPTION OF THE FIGURES

For a more complete understanding of example embodiments of the present technology, reference is now made to the following descriptions taken in connection with the accompanying drawings in which.

Figure 1A:
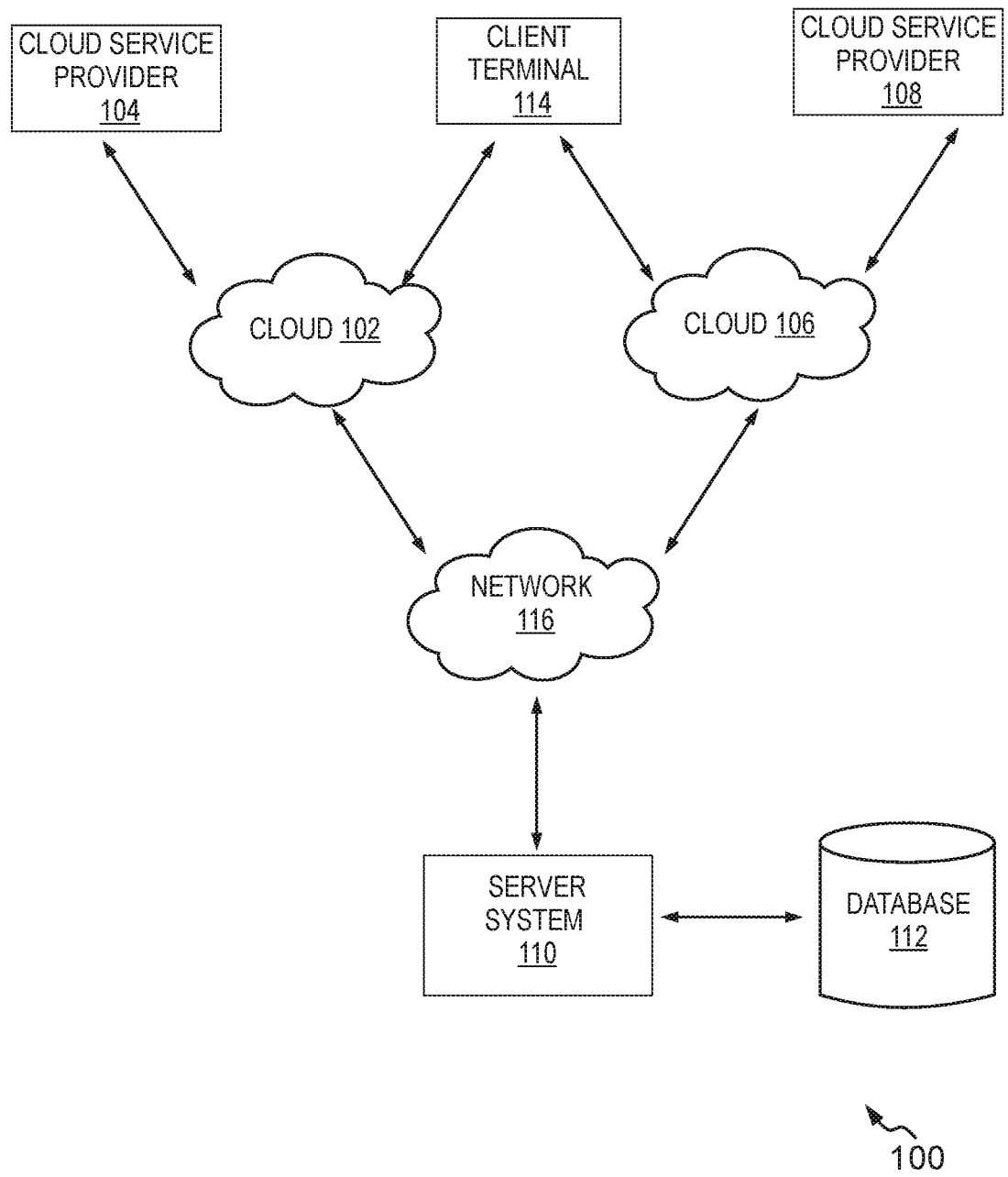
FIG. 1A is an example representation of an environment (e.g., cloud computing environment) related to at least some examples of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, systems and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification is not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Overview

Various embodiments of the present disclosure provide methods, systems electronic devices and computer program products for migrating resources of a virtual private cloud across multiple public cloud environments. The technical problem in existing solutions is that the existing solutions do not provide automated methods of translation or moving or restoring the resources (all of the VPC resources and their configurations) across different public cloud systems or environments. Further, the full discovery of all of the cloud resources and migration or reconstruction of one or more resources across different public cloud systems through an automated system is missing in the existing solutions. More specifically, the present disclosure describes techniques and methodology for discovering, storing, backing up, and transforming resource models for various resources within a VPC and constructing them across multiple public cloud environments.

In an example, the present disclosure describes a server system that automates migration of resources of a virtual private cloud across multiple cloud environments. The server system includes at least a processor and a memory. At first, the server system is configured to discover a plurality of resources associated with a source cloud via an application programming interface (API) of the source cloud. In other words, the server system is configured to send an API request for fetching information of the plurality of resources from the source cloud on periodic basis. The server system is configured to generate resource models associated with the plurality of resources based, at least in part, on the discovered resources of the source cloud, the resource models comprising information of the plurality of resources. In particular, the server system is configured to receive metadata associated with the discovered resources from the source cloud and parse the metadata represented in form of JavaScript (JS) objects. After parsing, the server system is configured to determine relationships between the plurality of resources of the source cloud and create database tables that is called as the resource models. The resource models are stored in a database. The resource models are updated at the predefined time intervals.

In similar manner, the server system is configured to generate resource models for other clouds (such as, target cloud) and store them in the database.

In one embodiment, the server system is configured to migrate the plurality of resources of the source cloud to a different region (i.e., target region) of the source cloud or the target cloud based, at least in part, on the resource models associated with the plurality of resources. For migrating the plurality of resources to the target cloud, the server system is configured to transmit recent resource models associated the plurality of resources of the source cloud to a translation manager of the target cloud. The translation manager translates the resource models into equivalent resource models compatible with the target cloud. Then, a cloud manager of the target cloud creates a plurality of first resources for the target cloud based, at least in part, on the equivalent resource models. Thus, the plurality of resources in the source cloud is mapped or equivalent to the plurality of first resources in the target cloud.

In one embodiment, to restore the infrastructure on the same source cloud, the resource models are input into a cloud manager of the source cloud which issues the action to create the resources from backed up or stored resource models.

Without in any way limiting the scope, interpretation, or application of the claims appearing below, technical effects of one or more of the example embodiments disclosed herein is provisioning of a cloud infrastructure mobility as a whole and preserving its resources configurations and inter-resource relationships across cloud providers. It gives customers or cloud tenants the freedom to implement disaster recovery strategies in multi-cloud. The present disclosure provides a way to discover and store all of the elements/resources associated with a tenant VPC using its resource model. Using the resource model, the server system can reconstruct or provision the same infrastructure in different regions in the same cloud or translate it to a different cloud for migration or restoration purposes. Hence, the present disclosure gives cloud tenants the infrastructure state preservation and protection as well as the freedom from being locked to a single cloud and can restore the infrastructure construct and elements (as one to one map for resources) on a different cloud provider (as long as similar resources are available).

Various example embodiments of the present disclosure are described hereinafter with reference to FIGS. 1 to 7.

FIG. 1A is an example representation of an environment 100 (e.g., cloud computing environment) related to at least some examples of the present disclosure. Although the environment 100 is presented in one arrangement, other embodiments may include the parts of the environment 100 (or other parts) arranged otherwise depending on, for example, performing resource migrations from one cloud to another cloud in an automated manner, etc. The environment 100 generally includes a cloud 102 handled by a cloud service provider 104, a cloud 106 handled by a cloud service provider 108, a server system 110 connected with a database 112, a client terminal 114, each coupled to, and in communication with (and/or with access to) a network 116. The network 116 may include, without limitation, a light fidelity (Li-Fi) network, a local area network (LAN), a wide area network (WAN), a metropolitan area network (MAN), a satellite network, the Internet, a fiber-optic network, a coaxial cable network, an infrared (IR) network, a radio frequency (RF) network, a virtual network, and/or another suitable public and/or private network capable of supporting communication among the entities illustrated in FIG. 1, or any combination thereof.

Various entities in the environment 100 may connect to the network 116 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, or any combination thereof. For example, the network 116 may include multiple different networks, such as a private network made accessible by clouds 102 and 106, the server system 110 and the client terminal 114, separately, and a public network (e.g., the Internet, etc.).

In one embodiment, the cloud 102 and the cloud 106 may be a public cloud such as a virtual private cloud. In another embodiment, the cloud 102 and the cloud 106 may be a hybrid cloud having a combination of private and public cloud computing services. A "public cloud" is a network having a set of resources provided by a cloud service provider to the general public. A "private cloud" is a network having a set of resources operated for a single end user. Some public clouds may run "virtual private clouds (VPCs)", each of which includes resources of the public cloud, and which provide various levels of isolation from other VPCs by, for example, using firewall rules between VPCs and/or a Private IP Subnet and a virtual communication construct for each VPC.

The cloud service providers 104 and 108 may be different providers or the same provider. Example of the cloud service providers may include, but are not limited to, organizations or private companies. In some scenarios, the clouds 102 and 106 may be hosted by multiple cloud service providers and/or may include multiple clouds hosted across multiple cloud service providers.

In one embodiment, the client terminal 114 that is in communication with the clouds 102 and 106 may receive input from a user for the clouds 102 and 106 to implement cloud computing services. For example, each of the clouds 102 and 106 may receive service requests from the client terminal 114 to perform cloud computing services, and to return a service result to the client terminal 114. End users may access cloud computing services using, for example, a web browser, mobile application, or thin client to access cloud-based applications and cloud-based data that implement the cloud computing services.

In one embodiment, the client terminal 114 may include any type or configuration of computing, mobile electronic, network, user, and/or communication devices that are or become known or practicable. Examples of the user device include a mobile phone, a smart telephone, a computer, a laptop, a PDA (Personal Digital Assistant), a Mobile Internet Device (MID), a tablet computer, an Ultra-Mobile personal computer (UMPC), a phablet computer, a handheld personal computer and the like. In one embodiment, the client terminal 114 is equipped with a migration application to generate user requests for migrating resources of one cloud to another cloud.

In one embodiment, the server system 110 may operate a migration service to allow restoration, backups between clouds in the cloud computing environment 100. In an embodiment, the server system 110 may reside software backend APIs associated with the migration application which instructs the server system 110 to perform one or more operations described herein. In one embodiment, the server system 110 is configured to perform resource migration from one cloud to another based on user input. In addition, the server system 110 should be understood to be embodied in at least one computing device in communication with the network 116, which may be specifically configured, via executable instructions, to perform as described herein, and/or embodied in at least one non-transitory computer-readable media.

In one embodiment, the server system 110 is configured to control the migration and restoration requests received by a plurality of clouds. The server system 110 is configured to discover a plurality of resources in a cloud, build resource models associated with the resources. The resource models may be stored in the cloud 102 itself. In some embodiments, the resource models associated with the cloud 102 may be stored in the database 112.

The number and arrangement of systems, devices, and/or networks shown in FIG. 1A is provided as an example. There may be additional systems, devices, and/or networks; fewer systems, devices, and/or networks; different systems, devices, and/or networks; and/or differently arranged systems, devices, and/or networks than those shown in FIG. 1A. Furthermore, two or more systems or devices shown in FIG. 1A may be implemented within a single system or device, or a single system or device shown in FIG. 1A may be implemented as multiple, distributed systems or devices. Additionally, or alternatively, a set of systems (e.g., one or more systems) or a set of devices (e.g., one or more devices) of the environment 100 may perform one or more functions described as being performed by another set of systems or another set of devices of the environment 100.

Figure 1B:
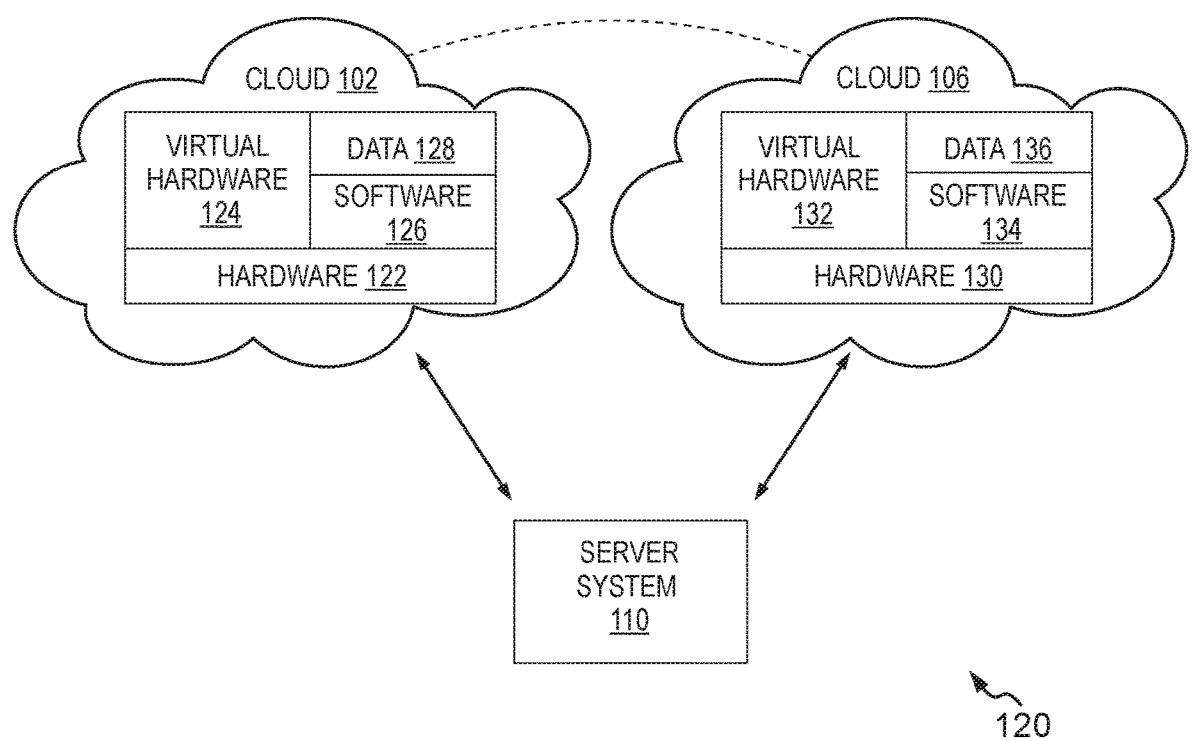
FIG. 1B is a simplified illustration of components of clouds present in the environment, in accordance with one embodiment of the present disclosure.

FIG. 1B is a simplified illustration 120 of components of clouds present in the environment 100, in accordance with one embodiment of the present disclosure. In one embodiment, the clouds 102 and 106 may be type of virtual private clouds.

The cloud 102 may have a network having resources such as hardware 122, virtual hardware 124, software 126, and data 128. In similar manner, the cloud 106 may have a network having resources such as hardware 130, virtual hardware 132, software 134, and data 136.

A "resource" is an asset of a cloud computing system such as hardware, virtual hardware, software, data, or cloud computing service. The resources may be distributed such that the clouds 102 and 106 may each implement distributed computing. Although two cloud service providers 104 and 108 and two clouds 102 and 106 are shown in FIG. 1B, any additional number of cloud providers and clouds may be present in the environment 100.

"Hardware" is a physical device that performs the actual computing, processing, or storage in a cloud. "Virtual hardware" is a software to be processed by hardware to emulate specific hardware or to abstract a resource that may have been accessed or addressed in a concrete manner. For example, a particular piece of software may be designed to be run by a specific type of hardware. By running virtual hardware on top of hardware, a given piece of hardware may run software designed for many different types of hardware.

"Software", e.g. an application, is a set of components such as data and instructions that, when executed by a processor, cause the processor to perform a process. The application may have specific components. Software may include, for example, business software, and user data stored in the cloud. Software may be designed to operate with specific hardware, which may indicate the format of the processor instructions. Thus, using virtual hardware may allow different types of hardware to operate the same software. "Data" may include any data stored in a cloud on any hardware, and/or as part of any software. The data may be located in various stacks in the cloud, including in hardware, software, applications, and/or services.

One or more resources, including hardware, virtual hardware, software, and data, may be used to implement "cloud computing services", which are services provided to an end user who is to use the cloud. Cloud computing services may be provided according to various models, for example Software as a Service (SaaS), which is a model of software deployment in which a user accesses and uses a piece of software from a remote location. Instead of purchasing a license to operate the software on a local machine, a user may be charged by usage of the software which is available over a cloud.

In one example, a virtual private cloud (VPC) may reside following resources:

VPC Name
Cloud Regions
Zones (a VPC can be in a single zone in a region or can spread across multiple zones)
IP Addressing Scheme
Subnets
Public Gateway
Network Address Translation function or gateway
Load Balancer
Virtual Private Network (VPN) Gateway
Transit Gateway
Security Group rules
Access Control Lists (ACLs)
DNS
SSH Keys
Content Caching
Virtual Machines and their profiles (such as operating systems, RAM, hard disk etc.)
Storage or Data volumes that are attached
Storage buckets
Kubernetes manifest or configuration file and its relationship with VPC
Kubernetes PODs, Services, Deployments and its relationship with the Infrastructure
Persistent volumes and its relationship with the VPC, and other such resources and their relationships with each other within a VPC.

Figure 2:
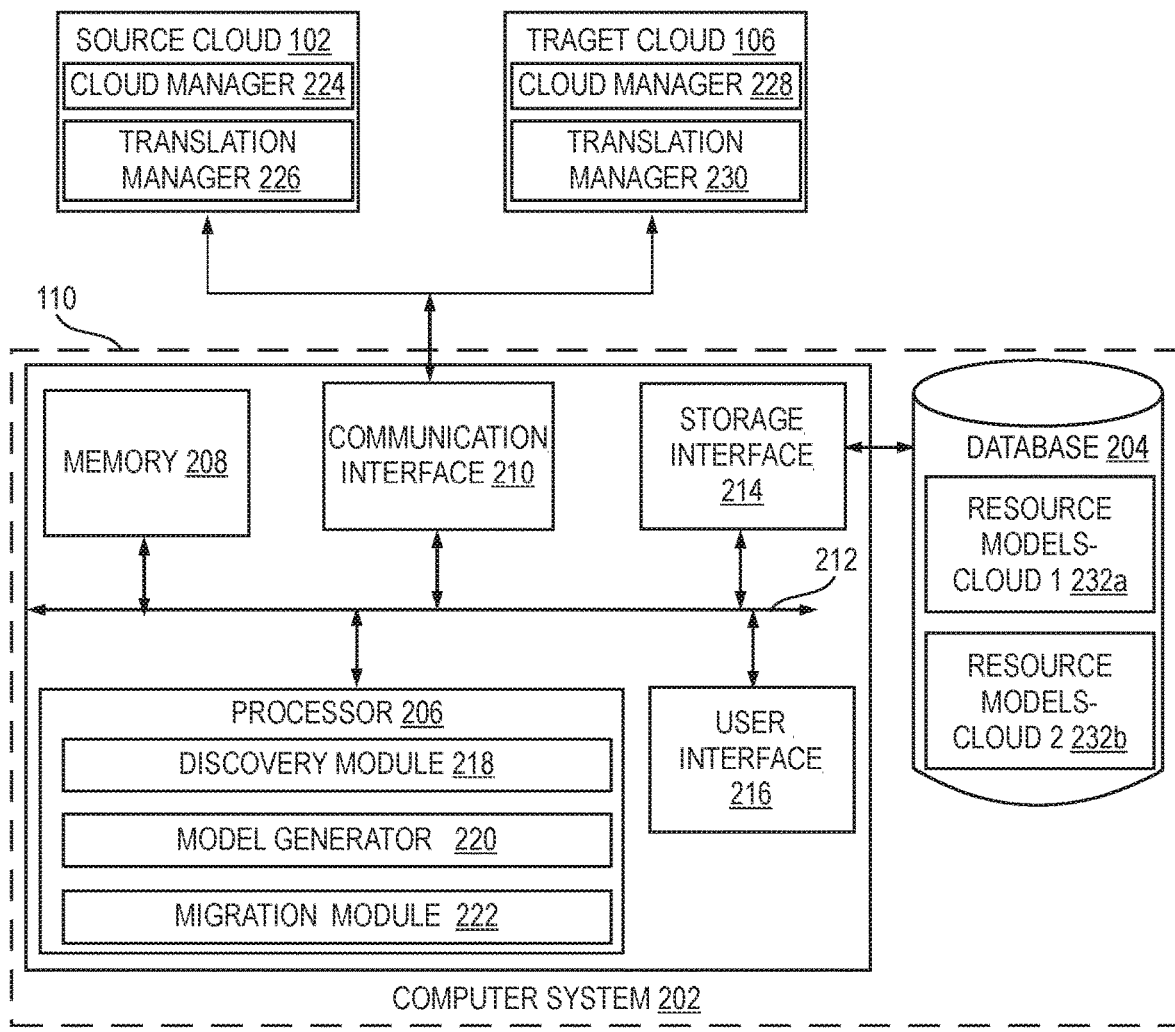
FIG. 2 is a simplified block diagram representation of clouds and a server system with additional aspects, in accordance with an embodiment of the present disclosure.

FIG. 2, in conjunction to the FIG. 1A, is a simplified block diagram representation 200 of the cloud 102, the cloud 106 and the server system 110 with additional aspects, in accordance with an embodiment of the present disclosure.

In some embodiments, the server system 110 is embodied as a cloud-based and/or SaaS-based (software as a service) architecture. As mentioned previously, the server system 110 is configured to discover, store, back-up, and transform resource models from various resources with a cloud (for example, VPC) and constructing them across multiple public cloud environments.

In one example embodiment, the server system 110 is configured to migrate some resources of the cloud 102 (i.e., "source cloud", interchangeably used throughout the description) to the cloud 106 (i.e., "target cloud", interchangeably used throughout the description) or multi virtual private cloud environments. The source cloud 102 contains its own hardware, software, and data that may need to be migrated to the target cloud 106. In one embodiment, the source cloud 102 and the target cloud 106 are virtual private clouds.

In one embodiment, the server system 110 includes a computer system 202 and a database 204 (i.e., it is similar to the database 112 as shown in FIG. 1A). The computer system 202 includes at least one processor 206 for executing instructions, a memory 208, a communication interface 210, and a user interface 216. The one or more components of the computer system 202 communicate with each other via a bus 212.

In one embodiment, the database 204 is integrated within the computer system 202. For example, the computer system 202 may include one or more hard disk drives as the database 204. A storage interface 214 is any component capable of providing the processor 206 with access to the database 204. The storage interface 214 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 206 with access to the database 204. In one embodiment, the database 204 may include resource models corresponding to each cloud present in the cloud computing environment 100.

The processor 206 includes suitable logic, circuitry, and/or interfaces to execute computer-readable instructions for facilitating the migration of one or more resources associated with the source cloud 102 to one or more clouds or specific regions in the source cloud 102. Examples of the processor 206 include, but are not limited to, an application-specific integrated circuit (ASIC) processor, a reduced instruction set computing (RISC) processor, a complex instruction set computing (CISC) processor, a field-programmable gate array (FPGA), and the like. The memory 208 includes suitable logic, circuitry, and/or interfaces to store a set of computer-readable instructions for performing operations. Examples of the memory 208 include a random-access memory (RAM), a read-only memory (ROM), a removable storage drive, a hard disk drive (HDD), and the like. It will be apparent to a person skilled in the art that the scope of the disclosure is not limited to realizing the memory 208 in the server system 110, as described herein. In some embodiments, the memory 208 may be realized in the form of a database server or a cloud storage working in conjunction with the server system 110, without deviating from the scope of the present disclosure.

The processor 206 is operatively coupled to the communication interface 210 such that the processor 206 is capable of communicating with remote device such as, the source cloud 102, the target cloud 106, etc. or with any entity connected to the network 116 (e.g., as shown in FIG. 1A).

It is noted that the server system 110 as illustrated and hereinafter described is merely illustrative of an apparatus that could benefit from embodiments of the present disclosure and, therefore, should not be taken to limit the scope of the present disclosure. It is noted that the server system 110 may include fewer or more components than those depicted in FIG. 2.

In one embodiment, the processor 206 includes a discovery module 218, a model generator 220, and a migration module 222. It should be noted that components, described herein, can be configured in a variety of ways, including electronic circuitries, digital arithmetic and logic blocks, and memory systems in combination with software, firmware, and embedded technologies.

Initially, the source cloud 102 may be there to allow the client terminal 114 to use cloud computing services of the source cloud 102. However, the source cloud 102 may not yet have migrated to the target cloud 106, thus the target cloud 106 may not yet contain certain resources that are to be cloned or replicated from the source cloud 102. Thus the target cloud 106 may not be available to allow the client terminal 114 to use the cloud computing services that may be used with source cloud 102. In one embodiment, the processor 206 is configured to receive a request from the client terminal to migrate some resources of the source cloud 102 to the target cloud 106. In one embodiment, the server system 110 may register with the cloud service provider 104 to discover cloud topology of the source cloud 102. In another embodiment, the client terminal 114 may provide access to his/her cloud account for discovering the cloud 102.

The discovery module 218 includes suitable logic, circuitry, and/or interfaces to execute computer-readable instructions for discovering a plurality of resources associated with the source cloud 102 in an automated manner. In particular, the discovery module 218 is configured to send an API (application programming interface) request to the source cloud 102 for fetching all the resources from the source cloud 102, concurrently. In one embodiment, the discovery module 218 sends API requests for fetching all the resources from the source cloud 102 at predefined time intervals on a periodic basis.

The discovered resources may include any of the resources as mentioned earlier, including VPC name, cloud regions, zones (a VPC can be in a single zone in a region or can spread across multiple zones), IP addressing scheme, subnets, public gateway, network address translation function or gateway, load balancer, virtual private network (VPN) gateway, transit gateway, security group rules, access control lists (ACLs), domain name system (DNS), secure shell (SSH) Keys, content caching, virtual machines and their profiles (such as operating systems, RAM, hard disk, etc.), storage or data volumes that are attached, storage buckets, Kubernetes manifest or configuration file and its relationship with VPC, Kubernetes Pods, services, deployments and its relationship with the infrastructure, persistent volumes and its relationship with the VPC, etc. Discovered hardware and software may include, for example, monitoring tools, management tools, load balancing hardware and/or software to distribute workloads across various computing resources in the source cloud 102, and auto scaling capability which is the ability of the target cloud 106 to automatically change the amount of processing and/or storage capacity as needed for any given cloud computing services, server operating systems, and applications.

Thus, the discovery module 218 is configured to fetch the latest information available of cloud infrastructure of multiple clouds present in the cloud computing environment. Thereafter, the discovery module 218 is configured to receive metadata from the source cloud 102 in form of JavaScript Object Notation (JSON) objects that are stored in a non-relational object store format. The JSON objects are provided by the source cloud via APIs.

The model generator 220 includes suitable logic, circuitry, and/or interfaces to execute computer-readable instructions for generating resource models corresponding to the source cloud 102 based on the discovered resources of the source cloud 102. The resource models may be generated automatically. However, in some examples, the generation of the resource models of the source cloud 102 may be additionally based at least partly on instructions from an end-user, such as an IT expert of the server system 110. In particular, the model generator 220 is configured to parse the metadata (i.e., JSON objects) and transform the parsed JSON objects to the resource models represented in form of their database table entries. The resource models include the resources and their relationships stored in the form of a database table entry. The JSON objects are transformed into resource models by mapping each JSON key to their respective resource model attributes. The JSON keys that contain information about the resource are mapped to respective database table's column, whereas JSON keys containing information about relation with another resource are mapped to relationships between the tables of the resource in question and the related resource. These database table entries denote resource models corresponding to the source cloud 102. The resource models may include information of the relationships/dependencies among the plurality of resources of the source cloud 102. The relationships among the plurality of resources may be one of: one-to-one relationships, one-to-many relationships, or many-to-many relationships as defined in the source cloud 102.

The resource models corresponding to the source cloud 102 are stored in the database 204 (see, resource models-cloud 1 232a). Each model stores information about the resources and configurations that have already been provisioned or created. The resource models are tables of a relational database created using an Object Relational Mapper (ORM). The columns of these database tables contain the information about the resources for which they are created, and the relationships between the resources are represented by the one-to-one, one-to-many or many-to-many relationships between the database tables as required. The resource models may also be configured to transform the resources into different representations, for example, JavaScript Object Notation (JSON), and the like In similar manner, the model generator 220 is configured to update resource models corresponding to the multiple clouds on a periodic basis in the database 204 at predefined time intervals. The resource models (see, resource models-cloud 2 232b) relate to resource and configuration details of the target cloud 106. The resource models associated with each of the clouds may be stored against a unique cloud identifier or any other primary attribute which is unique and may be used to specifically identify the cloud to which the resource models belong to.

The migration module 222 includes suitable logic, circuitry, and/or interfaces to execute computer-readable instructions for migrating one or more resources of the source cloud 102 to one or more target clouds (for example, target cloud 106). Based upon the resource migration request received from the client terminal 114 or cloud service providers, the migration module 222 is configured to provide updated or recent resource models associated with the source cloud 102 to the target cloud 106 for facilitating resource migration.

In one scenario, the resource migration may also happen in the same cloud at different regions. In one example, a user may have saved the entire VPC with all its resources and metadata such as name, IP addressing, ACLs, Security Groups, Load Balancer, VPNs, Gateway etc. However, the user only wants to restore ACLs and Security Groups in a different region and a different cloud in their existing cloud environment. For performing such resource migration, the migration module 222 creates a migration plan to discover, store, translate, restore resources across multiple accounts in the same cloud or different clouds in a flexible manner In one embodiment, the migration module 222 may simulate a migration of resources from the source cloud 102 to the target cloud 106 to validate the current instance of the resource models associated with the source cloud 102 and will be able to be used successfully in an actual migration. The migration module 222 may output simulation results of the simulated migration on a user device of the IT expert.

As shown in the FIG. 2, the source cloud 102 includes cloud manager 224 and translation manager 226. In similar manner, the target cloud 106 includes cloud manager 228 and translation manager 230.

The cloud managers 224 and 228 include suitable logic, circuitry, and/or interfaces to execute computer-readable instructions for utilizing cloud's provided APIs to read, create, delete or update resources. The cloud manager 228 is configured to create resources for the target cloud 106 equivalent to the resources associated with the source cloud 102. In particular, the cloud manager 228 is configured to take JSON objects of translated resource models as an input that satisfies the request schema of APIs. In case if the input is the model, the cloud manager 228 is configured to use resource model's representation transformation capabilities to convert the model into the JSON objects complying with the cloud's respective API requests' schema. These API request schemas are defined and provided by the source cloud 102 in their documentation and should be followed in order to make a successful API call.

In some embodiments, the cloud manager 224 of the source cloud 102 may receive resource models corresponding to the plurality of resources and instructions to restore the specific resources from the plurality of resources to the different regions. The cloud manager 224 is configured to recreate the resources received as resource models in the target regions. This process involves converting the received resource models to JSON objects corresponding to the request API schemas as required by the source cloud 102. Once converted, the cloud manager 224 uses these converted JSON objects to make API calls to the source cloud 102 to recreate the same resources in a different region. Thereafter, the discovery module 218 is configured to update the resource models associated with the source cloud 102.

In one embodiment, the cloud managers 224 and 228 are configured to utilize data analytics to perform the tasks requests in a right order. For example, when input resource models of VPC and a subnet (i.e., a resource of the VPC) are provided to the cloud manager for creation, the cloud manager may first create the VPC as the subnet is a dependent resource of the VPC. The cloud manager may wait for the completion of VPC system creation, and then move to the creation of subnet. Thus, the cloud manager has the ability to create workflows of cloud's APIs as required by the input resource models.

The translation managers 226 and 230 include suitable logic, circuitry, and/or interfaces to execute computer-readable instructions for translating resource models associated with other clouds to resource models compatible to their associated cloud. For example, the translation manager 230 is configured to translate the resource models associated with the source cloud 102 into first resource models compatible to the target cloud 106.

The translation managers 226 and 230 have input hooks (such as APIs or gRPC calls) from each of the other clouds. These inputs are the JSON representation of the source cloud's resource models which also contain the information regarding the relationships between them. The translation manager 230 contains the logic of translating the source cloud's JSON to the target cloud's JSON using expert knowledge. The translated JSON objects contain enough information to be fed to the target cloud's APIs to create all of the equivalent resources. Once these resources are created, they can be fetched using the cloud's APIs, parsed and stored in the database tables (i.e., resource models).

Figure 3:
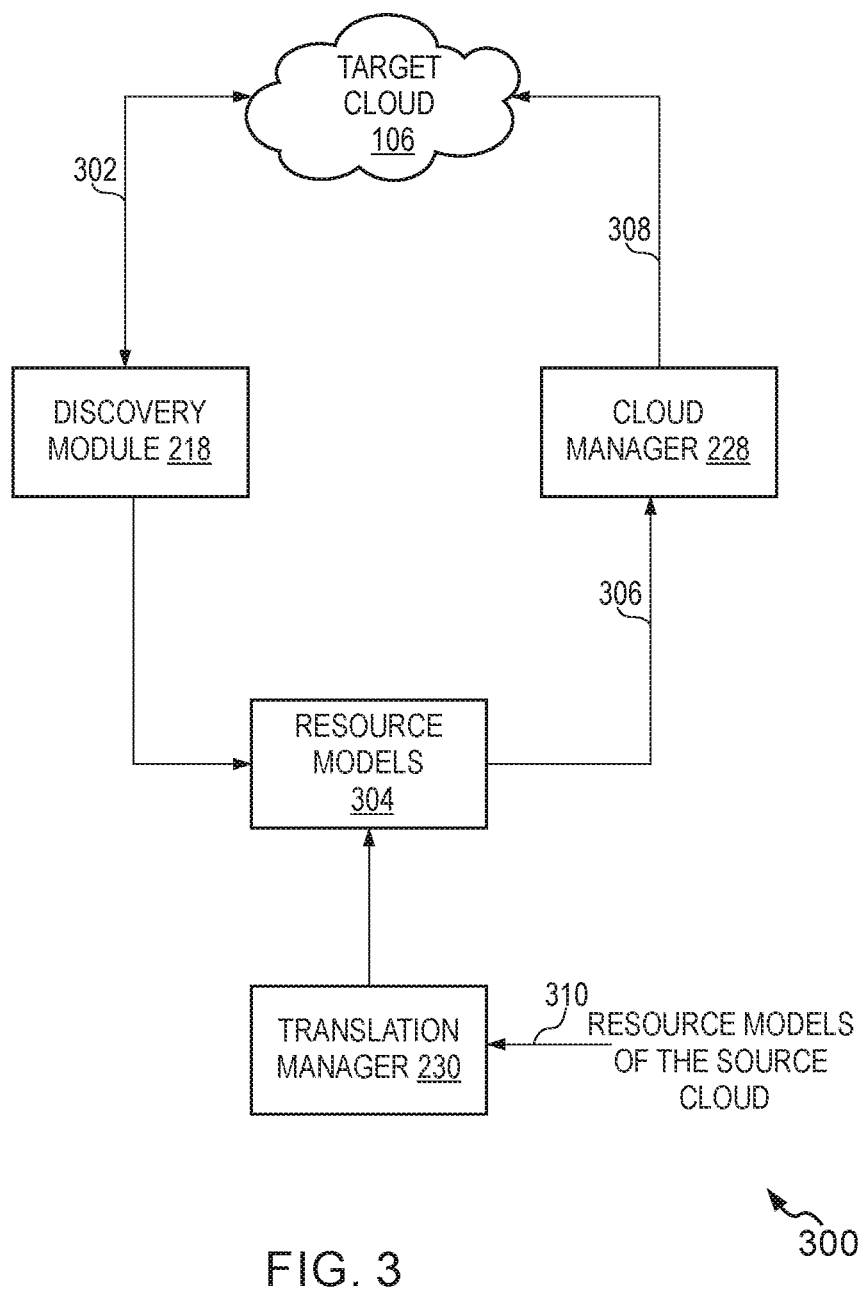
FIG. 3 is an example representation for restoring resources of a cloud to a different region in the same cloud or migrating resources of one cloud to another cloud, in accordance with an embodiment of the present disclosure.

FIG. 3 is an example representation 300 for restoring resources of the cloud 106 to a different region in the same cloud or migrating resources of one cloud 102 to another cloud 106, in accordance with an embodiment of the present disclosure.

At described above, the discovery module 218 is configured to discover all the resources of the cloud 106 via an API endpoint of the cloud 106. In particular, the discovery module 218 is configured to receive metadata (see, 302) including information of all the resources and relationships between them. The metadata is received in form of JavaScript objects. The discovery process in repeated after few minutes. The discovery module 218 is configured to generate and store resource models 304 associated with the target cloud 106 based upon the metadata.

In one scenario, the client terminal 114 may send a user request for restoring some resources (for example, ACLs) of the cloud 106 to a different region of the cloud 106.

Then, the cloud manager 228 associated with the cloud 106 is configured to access current or recent instance of the resource models of the target cloud 106 (see, 306). In particular, the cloud manager 228 is configured to take resource models of the resources as an input or the JSON that satisfies request schema of APIs. Based on the user request, the cloud manager 228 is configured to update locations of the resources (see, 308). Thus, to restore the infrastructure on the same cloud, the resource models are input into the cloud manager 228 which issues the action to create the resources from the backed up resource models.

In one scenario, the client terminal 114 may send a user request for migrating resources of the cloud 102 to the cloud 106. In this case, the migration module 222 is configured to provide recent or current instance of resource models of resources associated with the cloud 102 (see, 310) to the translation manager 230. The translation manager 230 is configured to translate the resource models of the cloud 102 into equivalent resource models compatible with the cloud 106, also maintaining the relations among the resources. Thus, to translate and provision the infrastructure in a different cloud, the resource models of the cloud 102 are input into the translation manager 230 of the cloud 106 that generates their equivalent resource models. These translated resource models are then fed to the cloud manager 228 which issues the action to create the resources from them. More illustratively, the cloud manager 228 hits the APIs exposed by the respective cloud providing information in the form of JSON object as required by that specific resource's API schema. The API schema is provided by the cloud in their documentation.

In other words, the cloud manager 228 is configured to receive current instance of resource models of the cloud 106 and equivalent resource models of migrating resources to create resources equivalent to the migrating resources.

Figure 4:
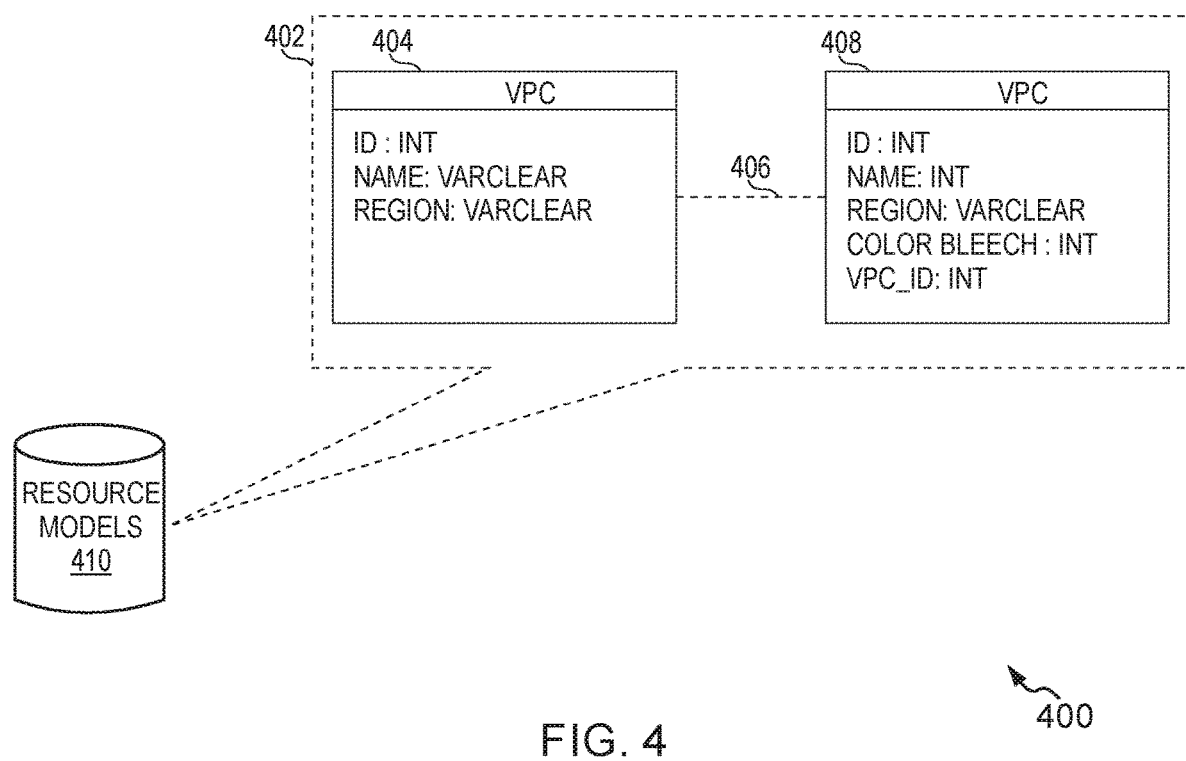
FIG. 4 is an example representation depicting information stored in a resource models associated with a source cloud, in accordance with an embodiment of the present disclosure.

FIG. 4 is an example representation 400 depicting information stored in resource models associated with a source cloud 102, in accordance with an embodiment of the present disclosure. The example representation 400 includes an exemplary database table 402 stored in the resource models 410. The database table 402 may be associated with the source cloud 102.

In the database table 402, there are two tables namely, VPC table 404 and the subnet table 406. The relationship between the VPC table and the subnet table is shown with the help of an entity-relationship notation 408. The VPC table 404 has a "name" column specifying the name of the VPC in the respective cloud and a "region" column specifying the region that VPC belongs to. The subnet table 406 has a "name" column specifying the name of the subnet, a "zone" column specifying the zone it belongs to, a "cidr_block" column specifying the classless inter-domain routing (CIDR) block of the subnet, and a "vpc_id" column foreign key from the VPC table 404 forming a one-to-many relationship. The entity relationship notation 408 is depicting a one-to-many relationship, depicting that one or more subnets may be associated with a single VPC cloud.

Similarly, the resource models associated with multiple virtual private clouds may be stored in the database 112.

Each resource model associated with a cloud may be implemented as described above. The database tables may be generated using the JSON objects of the resources as described earlier.

Figure 5:
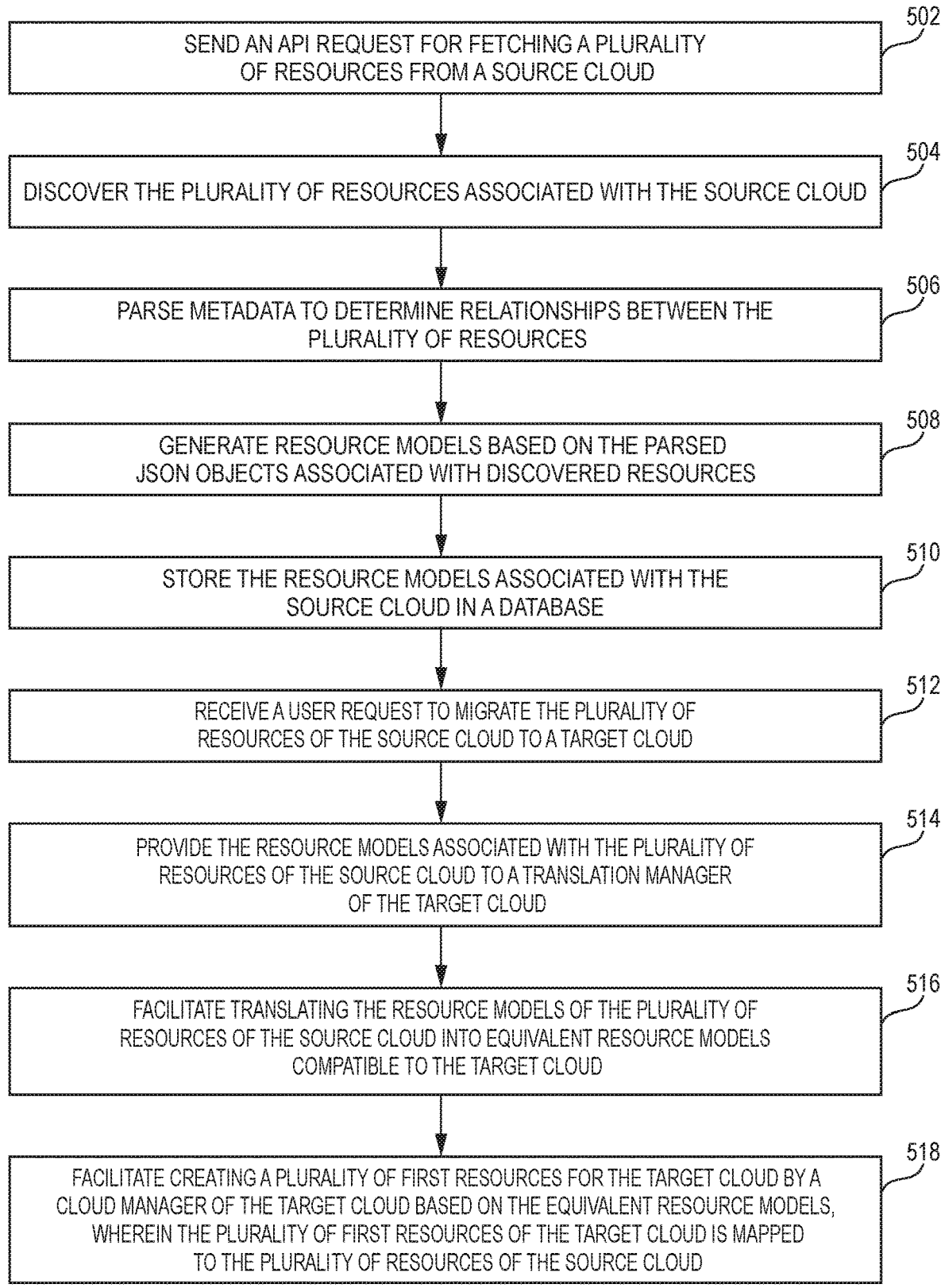
FIG. 5 is a flow chart for a process flow for migrating resources of a virtual private cloud (i.e., a source cloud) across public cloud environments, in accordance with an embodiment of the present disclosure.

FIG. 5 is a flow chart 500 for a process flow for migrating resources of a virtual private cloud (i.e., a source cloud) across public cloud environments, in accordance with an embodiment of the present disclosure. The process depicted in the flow chart 500 may be executed by, for example, at least one server system such as the server system 110. Operations of the flow chart 500, and combinations of operation in the flow chart 500, may be implemented by, for example, hardware, firmware, a processor, circuitry and/or a different device associated with the execution of software that includes one or more computer program instructions. The process flow may relate to migrating some resources of the source cloud 102 to the target cloud 106. For example, the software, data, and cloud computing services of the source cloud 102 may be migrated to the target cloud 106, as they are to replace and/or be added to the existing stock of resources in target cloud 106.

At 502, the server system 110 sends an API request for fetching a plurality of resources from the source cloud 102, concurrently.

At 504, the server system 110 discovers the plurality of resources associated with the source cloud 102. The discovered resources may include any of the resources as mentioned earlier, including VPC name, cloud regions, zones (a VPC can be in a single zone in a region or can spread across multiple zones), IP addressing scheme, subnets, public gateway, network address translation function or gateway, load balancer, virtual private network (VPN) gateway, transit gateway, security group rules, access control lists (ACLs), domain name system (DNS), secure shell (SSH) Keys, content caching, virtual machines and their profiles (such as operating systems, RAM, hard disk etc.), storage or data volumes that are attached, storage buckets, Kubernetes manifest or configuration file and its relationship with VPC, Kubernetes Pods, services, deployments and its relationship with the infrastructure, persistent volumes and its relationship with the VPC, etc.

In particular, the server system 110 receives metadata associated with discovered resources of the source cloud 102 in the form of JavaScript objects in some example embodiments.

At 506, the server system 110 parses the metadata (i.e., JSON objects) to determine relationships between the plurality of resources.

At 508, the server system 110 generates resource models based on the parsed JSON objects associated with discovered resources. In particular, the JSON objects are converted into their respective database table entries, creating the relationships between the plurality of resources and updating them, accordingly. The resource models are tables of a relational database created using an Object Relational Mapper (ORM). The columns of these database tables contain the information about the resources for which they are created, and the relationships between the resources are represented by the one-to-one, one-to-many or many-to-many relationships between the database tables as required. These resource models also have methods to transform them into different representations e.g., JavaScript Object Notation (JSON).

In similar manner, there are resource models generated for every cloud environment which store information about the resources and configurations that have already been provisioned/created. These resource models not only store the details of the individual resources but also the relations between them.

At 510, the server system 110 stores the resource models associated with the source cloud 102 in the database 112.

At 512, the server system 110 receives a user request to migrate the plurality of resources of the source cloud 102 to the target cloud 106.

In response to the user request, at 514, the server system 110 provides the resource models associated with the plurality of resources of the source cloud 102 to the translation manager 230 of the target cloud 106.

At 516, the server system 110 facilitates translating the resource models of the plurality of resources of the source cloud 102 into equivalent resource models which are compatible with the target cloud 106. The translation process is performed by the translation manager 226 of the target cloud 106.

At 518, the server system 110 facilitates creating a plurality of first resources for the target cloud 106 by the cloud manager 228 of the target cloud 106 based on the equivalent resource models. The plurality of first resources of the target cloud 106 is mapped to or equivalent to the plurality of resources of the source cloud 102.

Figure 6:
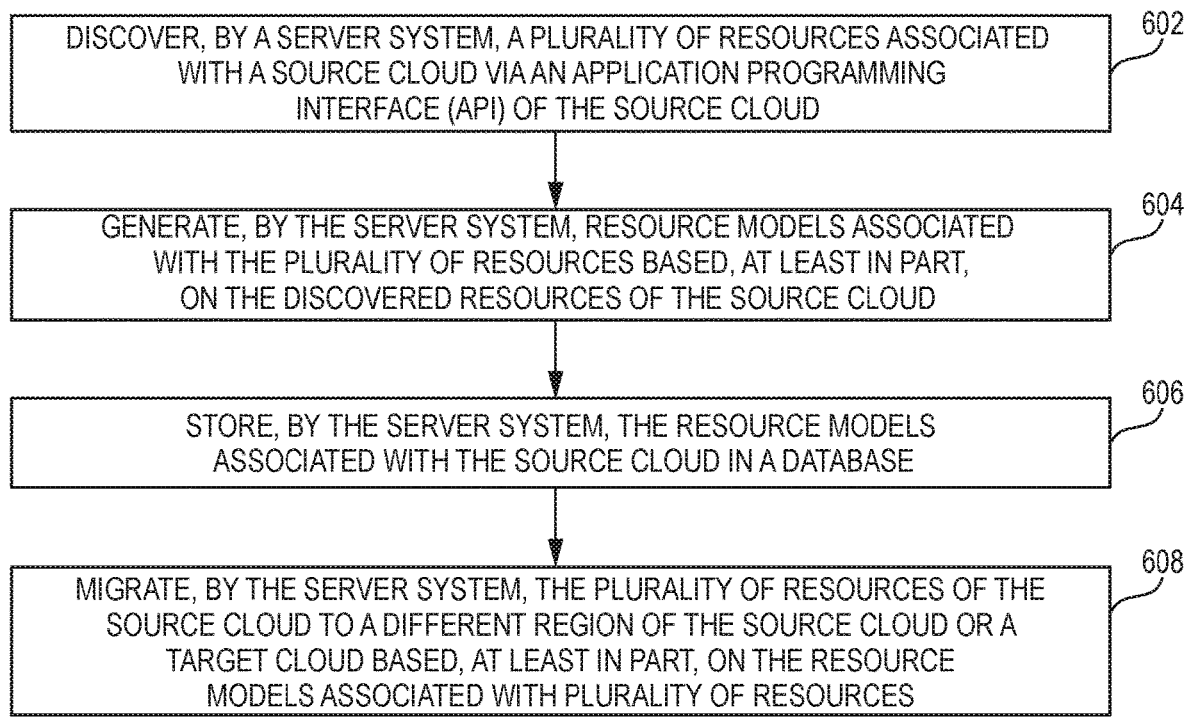
FIG. 6 is a flow diagram of a computer-implemented method for migrating resources of a virtual private cloud (i.e., a source cloud) across public cloud environments, in accordance with an embodiment of the present disclosure.

FIG. 6 is a flow diagram of a computer-implemented method for migrating resources of a virtual private cloud (i.e., a source cloud) across public cloud environments, in accordance with an embodiment of the present disclosure. The method 600 depicted in the flow diagram may be executed by, for example, the at least one server system such as the server system 110. Operations of the flow diagram of method 600, and combinations of operation in the flow diagram of method 600, may be implemented by, for example, hardware, firmware, a processor, circuitry and/or a different device associated with the execution of software that includes one or more computer program instructions. The method 600 starts at operation 602.

At the operation 602, the method 600 includes discovering a plurality of resources associated with a source cloud 102 via an application programming interface (API) of the source cloud 102.

At operation 604, the method 600 includes generating resource models associated with the plurality of resources based, at least in part, on the discovered resources of the source cloud 102. The resource models include, but is not limited to, information of the plurality of resources and relationships between the plurality of resources At operation 606, the method 600 includes storing the resource models associated with the source cloud 102 in a database (e.g., database 112).

At operation 608, the method 600 includes migrating the plurality of resources of the source cloud 102 to a different region of the source cloud 102 or a target cloud 106 based, at least in part, on the resource models associated with the plurality of resources.

Figure 7:
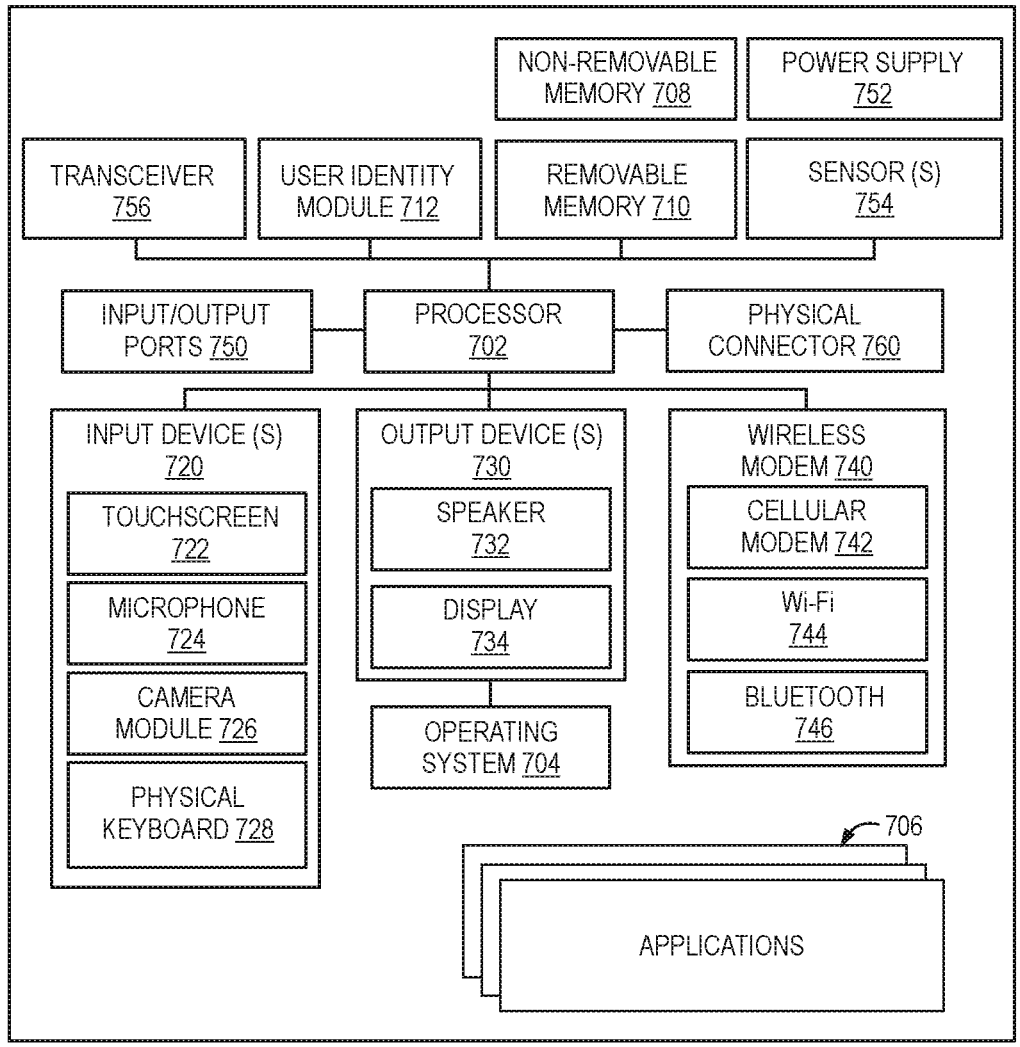
FIG. 7 shows a simplified block diagram of a client terminal capable of implementing the various embodiments of the present disclosure.

The sequence of operations of the method 600 need not be necessarily executed in the same order as they are presented. Further, one or more operations may be grouped together and performed in form of a single step, or one operation may have several sub-steps that may be performed in parallel or in sequential manner FIG. 7 shows a simplified block diagram of a client terminal 700 capable of implementing the various embodiments of the present disclosure. The client terminal 700 may be an example of the client terminal 114 shown in FIG. 1. It should be understood that the client terminal 700 as illustrated and hereinafter described is merely illustrative of one type of device and should not be taken to limit the scope of the embodiments. As such, it should be appreciated that at least some of the components described below in connection with the client terminal 700 may be optional and thus in an example embodiment may include more, less or different components than those described in connection with the example embodiment of the FIG. 7. As such, among other examples, the client terminal 700 could be any of an client terminal or may be embodied in any of the client terminals, for example, cellular phones, tablet computers, laptops, mobile computers, personal digital assistants (PDAs), mobile televisions, mobile digital assistants, or any combination of the aforementioned, and other types of communication or multimedia devices.

The illustrated client terminal 700 includes a controller or a processor 702 (e.g., a signal processor, microprocessor, ASIC, or other control and processing logic circuitry) for performing such tasks as signal coding, data processing, image processing, input/output processing, power control, and/or other functions. An operating system 704 controls the allocation and usage of the components of the client terminal 700 and provides support for one or more programs such as accessing cloud computing services of virtual private clouds and requesting migration of resources from one cloud to another features described herein. The applications 706 may include common computing applications (e.g., telephony applications, email applications, calendars, contact managers, web browsers, messaging applications such as USSD messaging or SMS messaging or SIM Tool Kit (STK) application) or any other computing application.

The illustrated client terminal 700 includes one or more memory components, for example, a non-removable memory 708 and/or a removable memory 710. The non-removable memory 708 and/or the removable memory 710 may be collectively known as storage device/module in an embodiment. The non-removable memory 708 can include RAM, ROM, flash memory, a hard disk, or other well-known memory storage technologies. The removable memory 710 can include flash memory, smart cards, or a Subscriber Identity Module (SIM). The one or more memory components can be used for storing data and/or code for running the operating system 704. The client terminal 700 may further include a user identity module (UIM) 712. The UIM 712 may be a memory device having a processor built in. The UIM 712 may include, for example, a subscriber identity module (SIM), a universal integrated circuit card (UICC), a universal subscriber identity module (USIM), a removable user identity module (R-UIM), or any other smart card. The UIM 712 typically stores information elements related to a mobile subscriber. The UIM 712 in form of the SIM card is well known in Global System for Mobile (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The client terminal 700 can support one or more input devices 720 and one or more output devices 730. Examples of the input devices 720 may include, but are not limited to, a touch screen/a display screen 722 (e.g., capable of capturing finger tap inputs, finger gesture inputs, multi-finger tap inputs, multi-finger gesture inputs, or keystroke inputs from a virtual keyboard or keypad), a microphone 724 (e.g., capable of capturing voice input), a camera module 726 (e.g., capable of capturing still picture images and/or video images) and a physical keyboard 728. Examples of the output devices 730 may include, but are not limited to, a speaker 732 and a display 734. Other possible output devices can include piezoelectric or other haptic output devices. Some devices can serve more than one input/output function. For example, the touch screen 722 and the display 734 can be combined into a single input/output device.

A wireless modem 740 can be coupled to one or more antennas (not shown in the FIG. 7) and can support two-way communications between the processor 702 and external devices, as is well understood in the art. The wireless modem 740 is shown generically and can include, for example, a cellular modem 742 for communicating at long range with the mobile communication network, a Wi-Fi compatible modem 744 for communicating at short range with an external Bluetooth-equipped device or a local wireless data network or router, and/or a Bluetooth-compatible modem 746. The wireless modem 740 is typically configured for communication with one or more cellular networks, such as a GSM network for data and voice communications within a single cellular network, between cellular networks, or between the client terminal 700 and a public switched telephone network (PSTN).

The client terminal 700 can further include one or more input/output ports 750, a power supply 752, one or more sensors 754 for example, an accelerometer, a gyroscope, a compass, a global positioning system sensor (for providing location details) or an infrared proximity sensor for detecting the orientation or motion of the client terminal 700, a transceiver 756 (for wirelessly transmitting analog or digital signals) and/or a physical connector 760, which can be a USB port, IEEE 1294 (FireWire) port, and/or RS-232 port. The illustrated components are not required or all-inclusive, as any of the components shown can be deleted and other components can be added.

The disclosed method with reference to FIG. 6, or one or more operations of the method 600 may be implemented using software including computer-executable instructions stored on one or more computer-readable media (e.g., non-transitory computer-readable media, such as one or more optical media discs, volatile memory components (e.g., DRAM or SRAM)), or non-volatile memory or storage components (e.g., hard drives or solid-state non-volatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such a suitable communication means includes, for example, the Internet, the World Wide Web, an intranet, software applications, cable (including fibre optic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the server system 110 and its various components such as the computer system 202 and the database 204 may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the invention, as discussed above, may be practiced with steps and/or operations in a different order, and/or with hardware elements in configurations, which are different than those which are disclosed. Therefore, although the invention has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A computer-implemented method comprising:
    discovering, by a server system, a plurality of resources associated with a source cloud via an application programming interface (API) of the source cloud;
    generating, by the server system, resource models associated with the plurality of resources based, at least in part, on the discovered resources of the source cloud, the resource models comprising information of the plurality of resources and relationships between the plurality of resources;
    storing, by the server system, the resource models associated with the source cloud in a database; and
    migrating, by the server system, the plurality of resources of the source cloud to a different region of the source cloud or a target cloud based, at least in part, on the resource models associated with the plurality of resources;
    wherein migrating the plurality of resources to the target cloud comprises:
    transmitting the resource models associated the plurality of resources of the source cloud to the target cloud;
    translating the resource models into equivalent resource models compatible with the target cloud; and
    creating a plurality of first resources for the target cloud based, at least in part, on the equivalent resource models, the plurality of resources in the source cloud mapped to the plurality of first resources in the target cloud.

2. The computer-implemented method as claimed in claim 1, wherein the source cloud and the target cloud are types of virtual private cloud (VPC).

3. The computer-implemented method as claimed in claim 1, further comprising: updating, by the server system, the resource models corresponding to the source cloud at predefined time intervals.

4. The computer-implemented method as claimed in claim 1, wherein generating the resource models associated with the plurality of resources further comprises:
    parsing metadata associated with the discovered resources;
    determining the relationships between the plurality of resources; and
    creating database tables based on the determined relationships.

5. The computer-implemented method as claimed in claim 4, wherein the resource models are stored in the form of database tables.

6. The computer-implemented method as claimed in claim 4, wherein the metadata associated with the discovered resources is represented in form of JavaScript (JS) objects.

7. The computer-implemented method as claimed in claim 4, wherein the relationships between the plurality of resources are one of: one-to-one relationships, one-to-many relationships, and many-to-many relationships.

8. A server system, comprising:
a communication interface;
a memory comprising executable instructions; and
a processor communicably coupled to the communication interface, the processor configured to execute the executable instructions to cause the server system to at least:
discover a plurality of resources associated with a source cloud via an application programming interface (API) of the source cloud,
generate resource models associated with the plurality of resources based, at least in part, on the discovered resources of the source cloud, the resource models comprising information of the plurality of resources and relationships between the plurality of resources,
store the resource models associated with the source cloud in a database, and
migrate the plurality of resources of the source cloud to a different region of the source cloud or a target cloud based, at least in part, on the resource models associated with the plurality of resources;
wherein, to migrate the plurality of resources to the target cloud, the server system is further caused to:
transmit the resource models associated with the plurality of resources of the source cloud to the target cloud;
translate the resource models into equivalent resource models compatible with the target cloud; and
create a plurality of first resources for the target cloud based, at least in part, on the equivalent resource models, the plurality of resources in the source cloud mapped to the plurality of first resources in the target cloud.

9. The server system as claimed in claim 8, wherein the source cloud and the target cloud are types of virtual private cloud (VPC).

10. The server system as claimed in claim 8, wherein the server system is further caused to:
update the resource models corresponding to the source cloud at predefined time intervals.

11. The server system as claimed in claim 8, wherein, to generate the resource models associated with the plurality of resources of source cloud, the server system is further caused to:
parse metadata associated with the discovered resources;
determine the relationships between the plurality of resources; and
create database tables based on the determined relationships.

12. The server system as claimed in claim 11, wherein the resource models are stored in the form of database tables.

13. The server system as claimed in claim 11, wherein the metadata associated with the discovered resources is represented in form of JavaScript (JS) objects.

14. The server system as claimed in claim 11, wherein the relationships between the plurality of resources are one of: one-to-one relationships, one-to-many relationships, and many-to-many relationships.

15. A computer-implemented method for migrating virtual private cloud (VPC) resources across public cloud environments, the computer-implemented method comprising:
discovering, by a server system, a plurality of resources associated with a source cloud via an application programming interface (API) of the source cloud;
generating, by the server system, resource models associated with the plurality of resources based, at least in part, on the discovered resources of the source cloud, the resource models comprising information of the plurality of resources and relationships between the plurality of resources;
storing, by the server system, the resource models associated with the source cloud in a database; and
migrating, by the server system, the plurality of resources of the source cloud to a different region of the source cloud or a target cloud based, at least in part, on the resource models associated with the plurality of resources;
wherein migrating the plurality of resources to the target cloud comprises:
transmitting, by the server system, the resource models associated the plurality of resources of the source cloud to the target cloud;
translating the resource models into equivalent resource models compatible with the target cloud; and
creating a plurality of first resources for the target cloud based, at least in part, on the equivalent resource models, the plurality of resources in the source cloud mapped to the plurality of first resources in the target cloud.

16. The computer-implemented method as claimed in claim 15, wherein the source cloud and the target cloud are types of virtual private cloud (VPC).

17. The computer-implemented method as claimed in claim 15, further comprising: updating, by the server system, the resource models corresponding to the source cloud at predefined time intervals.

* * * * *